United States Patent [19]

Soethout et al.

[11] Patent Number: 5,080,002

[45] Date of Patent: Jan. 14, 1992

[54] OUTLET NOZZLE FOR VENTILATION OR AIR-CONDITIONING SYSTEMS

[75] Inventors: Freddie Soethout, Pulheim; Martin Prause, Coburg, both of Fed. Rep. of Germany

[73] Assignees: Siemens Aktiengesellschaft, Berlin; Siemens Aktiengesellschaft, Munich, both of Fed. Rep. of Germany

[21] Appl. No.: 579,158

[22] Filed: Sep. 7, 1990

[30] Foreign Application Priority Data

Sep. 12, 1989 [EP] European Pat. Off. ........ 89116882.5
Oct. 24, 1989 [EP] European Pat. Off. ........ 89119753.5

[51] Int. Cl.$^5$ .......................... B60H 1/24; F24F 13/06
[52] U.S. Cl. ...................................... 454/154; 454/313
[58] Field of Search ............... 98/2, 40.24, 2.11, 40.2, 98/40.28

[56] References Cited

U.S. PATENT DOCUMENTS

| | | | |
|---|---|---|---|
| 2,317,798 | 4/1943 | Otto | 98/40.24 |
| 2,901,961 | 9/1959 | Cotts | 98/40.24 |
| 3,495,521 | 2/1970 | Foster | 98/40.24 |
| 3,648,590 | 3/1972 | Mercier | 98/2 D |
| 4,664,022 | 5/1987 | Odenino | 98/2 |
| 4,664,023 | 5/1987 | Miyadera et al. | 98/2 |
| 4,840,113 | 6/1989 | Freitag et al. | 98/2 |

FOREIGN PATENT DOCUMENTS

| | | |
|---|---|---|
| 0257500 | 10/1988 | European Pat. Off. . |
| 0257500 | 10/1988 | European Pat. Off. . |
| 2003697 | 1/1971 | Fed. Rep. of Germany . |
| 2616386 | 12/1988 | France . |
| 0033048 | 2/1983 | Japan ............................. 98/2 |
| 0175955 | 9/1985 | Japan ............................. 98/40.24 |
| 0244618 | 12/1985 | Japan ............................. 98/2 |

OTHER PUBLICATIONS

Patent Abstracts of Japan, vol. 8, No. 26, 2/3/84 and JP-A-58 184 439 (Nissan Jidosha K.K.), 10/27/83.

*Primary Examiner*—Albert J. Makay
*Assistant Examiner*—William C. Doerrler
*Attorney, Agent, or Firm*—Kenyon & Kenyon

[57] ABSTRACT

Starting with an outlet nozzle having directional louvers which are mutually slaved by a coupler in the region of their air-intaking back edge and are respectively able to swivel around a swivel axis which runs parallel to the front edge on the outlet side, a further increase of comfort can be achieved by means of an additional diffused setting of the directional louvers with simple means of small construction, whereby the directional louvers are guided in the region of their back edges by those types of crank guideways for the directional louvers in a horizontally and vertically guided crank carriage. The directional louvers are guided in a first setting of the crank carriage into a parallel directed airstream setting with the ability to swivel parallel to each other. During a horizontal movement of the crank carriage, the louvers are correspondingly guided into the respective diffused-flow setting by their respective crank guideways.

14 Claims, 2 Drawing Sheets

OUTLET NOZZLE FOR VENTILATION OR AIR-CONDITIONING SYSTEMS

BACKGROUND OF THE INVENTION

The present invention relates to ventilation or air-conditioning systems and more particularly to an outlet nozzle in motor vehicles for such a system.

German Patent Application DE-A20257500 discloses an outlet nozzle for ventilation or air conditioning systems having several direction louvers which are respectively able to swivel around a swivel axis running parallel to an outlet sided front edge. The louvers can be placed in a parallel directed airstream setting or a diffused-flow setting near the back edge of the louvers on the intake side while being mutually slaved by the crank guides of a coupler.

In the case of the above known outlet nozzle, the directional louvers are swivelled by a crank cylinder which is supported in the lateral walls of the nozzle housing with the ability to turn both parallel to the directional louvers and in an axially displaceable manner. The crank cylinder and the control element which controls it are displaced in a more or less axial direction according to a sweep setting.

In another known case which only provides a parallel adjustment of the directional louvers, these louvers are swivel-supported in the lateral walls of the outlet nozzle housing on their front edges by way of marginal journals. The back edges of the directional louvers are connected together by a coupler such that, when one directional louver is swivelled by a control knob which is mounted on the front edge of the louver, the rest of the directional louvers are able to be coadjusted in parallel such that the air being conveyed can flow out as a directed airstream either into the headroom of the passenger compartment or into the legroom of the inside of the vehicle or into a so-called middle plane, optionally with possible intermediate settings.

The problem with these known outlet nozzles is that they do not provide directed diffuse-airstream capability without complex construction.

SUMMARY OF THE INVENTION

Starting with an outlet nozzle of the above type, an additional diffused setting can be achieved with little additional complexity, while retaining the available installation space as well as achieving greater user-friendliness by providing a flat crank carriage which can be displaced in the axial direction of the outlet nozzle. The carriage includes a plurality of crankways which run along the surface and act as couplers to sweep-slave the directional louvers.

A particularly reliable separation of functions between a horizontally-directed sweep of air on the one hand and a diffused-flow setting of the directional louvers on the other hand can be achieved despite the ever-present possibility of making a transition from the one function to the other by means of this type of design of the crankways. Starting from the first setting of the crank carriage, for directed stream, the back edges of the directional louvers are first guided in a horizontal parallel sweep by corresponding horizontally moving crankways. The louvers subsequently are guided away from the parallel setting into a second diffused setting while the crank carriage moves horizontally with the back edges of the louvers moving in a correspondingly airflow diffusing manner. In the first setting of the crank carriage, the directional louvers can be swivelled parallel to each other without obstruction by the crank carriage, the crank carriage taking on the function of the conventional coupler—such as in the second known nozzle configuration described above. In that configuration, a control knob is mounted on the front edge of a directional louver to control the parallel swivel of the louvers.

The flat crank carriage may be both vertically and horizontally displaceable and the crankways may be designed to move the directional louvers into the diffused flow setting by horizontal movement of the crank carriage.

In the first setting of the crank carriage, the back edges of the directional louvers may be first guided in a horizontal parallel swivelling motion.

The nozzle construction may further include the positioning of journals on both sides of the front edge of the directional louvers respectively within one lateral wall of the outlet nozzle housing. Furthermore, at least one marginal journal guide of the back edge of the directional louvers is provided and the journal guide is capable of horizontal and vertical guiding in a lateral wall of the outlet nozzle housing.

According to a development of the present invention, the comfort-enhancing diffused flow of air can be further improved with simple means in that additional louvers are swivel-mounted in the margins of the outlet housing above and below the directional louvers such that the airstream flowing through the outlet nozzle is deflected at the front and/or bottom edge of the outlet nozzle housing away from the horizontal direction of the directed airstream to the outside, which has a diffusive effect.

To control the crank carriage, a rotary control knob, whose rotary movement is converted by a known integrated crank gear into the horizontal movement of the crank carriage, is provided in an especially compact and user-friendly configuration. In a design-enhancing and compact method of construction, the rotary control knob is also mounted to the side of the directional louvers within the outlet nozzle housing which is present and remains unchanged. By means of the rotary control knob, in another advantageous and compact method of construction, the additional louvers can also be sweep-slaved by a pinion drive which is practically mounted radially outside the crank drive for the crank carriage while continuing to utilize the available installation space.

BACKGROUND OF THE INVENTION

DETAILED DESCRIPTION

Figure 1:
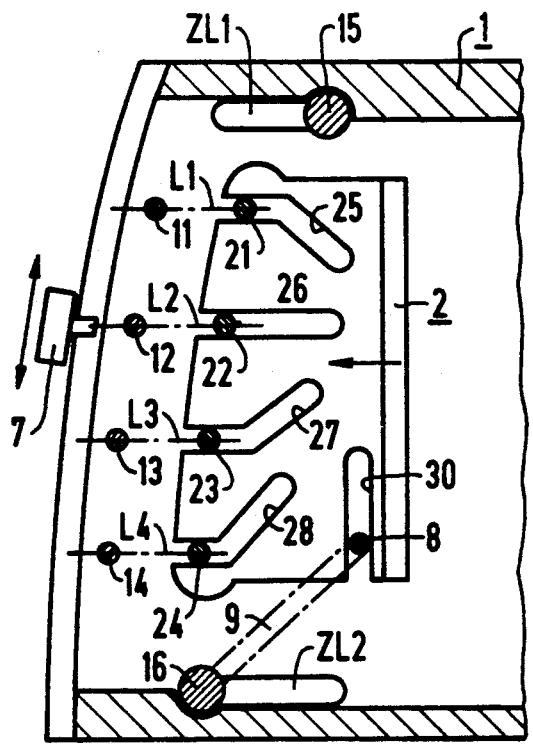
FIG. 1 illustrates a plan view of the marginal crank guide of the directional louvers in a crank carriage according to an embodiment of the present invention placed at a directed airstream setting of the crank carriage in a partial view according to the sectional path II—II in FIG. 4.

According to FIG. 1, a crank carriage 2, which is horizontally and vertically displaceable in one of its settings, the directed airstream setting, is mounted at the one margin of four directional louvers L1-L4 at the horizontally parallel directed airstream setting, which is indicated by dotted lines for the sake of clarity. The intake is from the right of the carriage and the outflow is to the left of the louvers. The directional louvers L1-L4 are pivotally supported on their front edges by rotatable journals 11-14 within a wall section of the outlet nozzle housing 1 around horizontal swivel axes. The back edges of the directional louvers L1-L4 are guided into the crankways or crank guideways 25-28 of the crank carriage 2 by marginal journals 21-24, which are provided in the vicinity of the back edges, such that, in the depicted first initial setting of the crank carriage of FIG. 1, the directional louvers are able to be set by the vertical movement of the crank carriage to a position in which the louvers are with each other and has a changeable directed flow of the airstream. For instance, movement of the carriage in an upwards direction would provide a parallel "directed stream" outflow in a downward direction as the marginal journals are moved in an upward direction. Conversely, movement of the carriage in a downward direction would provide a parallel "directed stream" outflow in an upward direction as the marginal journals are moved in a downward direction.

A control knob 7 serves to control this type of a variable directed airstream. This control knob 7 is mounted on the directional louver 2 on the left side, whereby the directional louver L2 and, via the crank carriage 2, also the remaining directional louvers L1,L3,L4 are able to be adjusted by the up and down movements of the control knob 7 so that they are parallel to each other in a manner such that the airstream entering the outlet nozzle from the right can exit upwards, into the middle plane, or down into the legroom—optionally with potential intermediate settings—into the passenger compartment of a vehicle according to the respective parallel setting of the directional louvers L1-L4.

Figure 2:
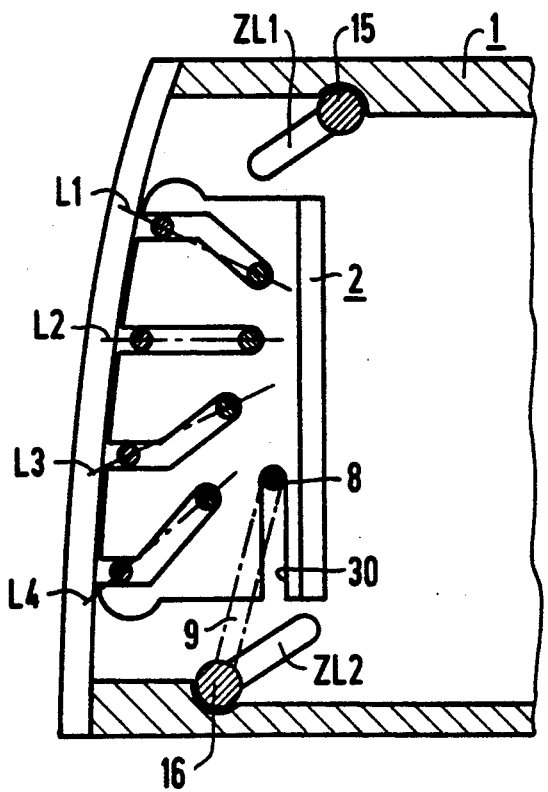
FIG. 2 illustrates the configuration according to FIG. 1 in the case of a diffused-flow setting of the crank carriage.

In the case of a movement of the crank carriage 2 in a horizontal direction from right to left, from intake toward outflow regions, out of the first directed airstream setting shown in FIG. 1 into the second "diffused-flow" setting shown in FIG. 2, the journals 21-24 of the directional louvers L1-L4 are brought into a diffused-flow setting by correspondingly arranging the crankways 25-28, whereby a maximum airstream continues to exit; but not as a directed stream of air which can be considered by a passenger to be generally uncomfortable, but rather which enters the passenger compartment as a diffused, dispersed flow of air.

As can be seen in FIG. 1 and FIG. 2, the crankways are designed in an advantageous manner such that, starting from the first setting of the crank carriage 2 according to FIG. 1, the back edges of the directional louvers L1-L4 are first guided in a horizontal parallel sweeping motion by a corresponding stop location, preferably by means of first parallel curved paths, such that a parallel sweeping motion for a change in the direction of airflow is reliably guaranteed in this first initial setting.

When utilizing the present installation space in an advantageous manner according to a development of the invention, additional louvers ZL1 and ZL2 are swivel-mounted above and below the directional louvers L1 and L4, either directly or indirectly within the pivot bearings 15,16 on the outlet nozzle housing such that the additional louvers have no effect on the airflow at the directed airstream setting of the crank carriage 2 according to FIG. 1. The additional louvers are pivoted into the airflow space of the outlet nozzle at the diffused-flow setting of the crank carriage 2 according to FIG. 2, such that the airflow entering from the right is deflected around the upper and lower outlet edge of the outlet nozzle housing 1 as additional diffusion, and, on the whole, an optimum diffused-flow characteristic is achieved.

Figure 3:
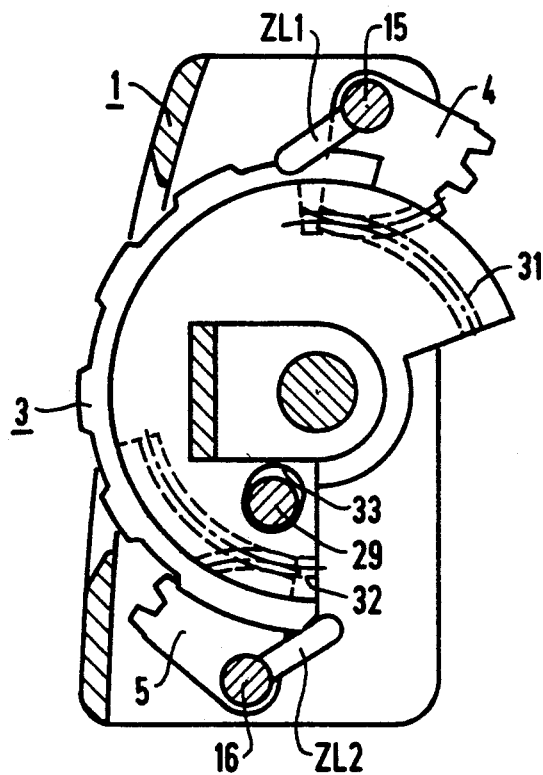
FIG. 3 illustrates an axial plan view of a rotary control knob which controls both the crank carriage as well as the additional louvers according to an embodiment of the present invention in a sectional view according to the sectional path III—III in FIG. 4.
Figure 4:
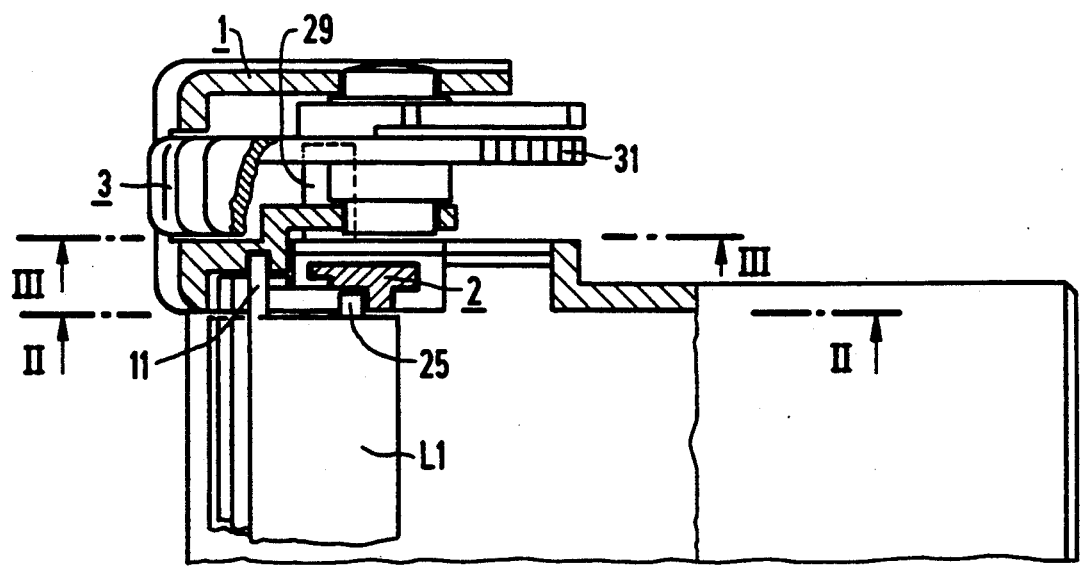
FIG. 4 illustrates a vertical plan view of a part of the outlet nozzle according to an embodiment of the present invention in the case of an outlet nozzle housing which has been opened or cut away in the upper part.

According to a development of the invention, a rotary control knob 3, which is shown more closely in FIGS. 3 and 4 and whose rotary motion is converted by a known crank gear into a translatable movement of the crank carriage 2, is used to control the crank carriage 2 during the horizontal adjustment between the first setting "directed" louver setting of FIG. 1 and the second "diffused" lower setting of FIG. 2. Serving this purpose within the rotary control knob 3 is a slotted slaving aperture 33, with which a slaving journal 29 of the crank carriage 2 mates. In a particularly advantageous manner, a swivelling of the additional louvers ZL1 and ZL2 can be achieved by the rotary control knob, without requiring additional installation space and thus without the necessity of enlarging the outlet nozzle housing, in a manner such that, according to FIGS. 3 and 4, this rotary control knob has a pinion with a pinion toothing 31,32 for corresponding pinion gear slaving device sections 4,5, which are able to slave-sweep with the additional louvers ZL1 and ZL2 around the pivot bearings 15,16. The sweep slaving device thereby is located radially outside of the slaving device of the crank carriage and therefore does not require additional installation width.

A swivelling of the additional louvers, ZL1 and ZL2 can be achieved in a structurally simpler yet fully viable manner according to a further development of the present invention which is indicated for the additional louver LZ2 in FIGS. 1 and 2. In this modified configuration, additional louvers are set by an additional crankway or crank guide, in particular by an additional crank guide in the crank carriage 2 while it is linearly operating according to the sweep slaving device. Additional crankway or crank guide 30 is provided in the crank carriage 2 of FIGS. 1 and 2, within which crankway a guide pin 8 is slide-mounted which is sweep-slaved to the additional louver LZ2 via a coupling rod 9. In the case of a fixed connection between the coupling rod 9 with the additional louver LZ2 on the one hand and the guide pin 8 on the other, the latter must be rotatable— e.g. due to a round cross section—relative to the crankway 30. Otherwise, a joint articulation between the coupling rod 9 and the guide pin 8 is provided. During the thrusting movement of the crank carriage 2 from the setting according to FIG. 1 into the setting according to FIG. 2, the guide pin 8 is moved upward in the crankway 30 and thereby swings the additional louver LZ2 over the coupling rod 9 into its diffused setting according to FIG. 2.

While retaining to a large extent the design of the known outlet nozzle housing which has been advantageously added to by the present invention, and while maintaining its mounting dimensions, the rotary control knob 3 is integrated on the one margin of the directional louvers L1-L4 within the outlet nozzle housing 1. On the other margin of the directional louvers L1-L4, then, a corresponding rotary control knob can be provided in a manner not shown here, e.g. to adjust a laterally directed flow effect of the airstream by means of additional directional louvers which are vertically mounted, adjustable, and provided behind the horizontally mounted directional louvers L1-L4.

What is claimed is:

1. An outlet nozzle for ventilation or air-conditioning systems, in motor vehicles comprising:
   a plurality of directional louvers which are respectively able to swivel around a swivel axis running parallel to a front edge of the outlet;
   a coupler having a plurality of crankguides, each directional louver being associated with one of said crankguides;
   said louvers being positionable in a parallel directed airstream setting and a diffused-flow setting when near a back edge of the crankguides on the intake side while being mutually slaved by said crankguides of said coupler;
   said coupler comprising a flat crank carriage, which is able to be displaced in the axial direction of the outlet nozzle and including said crankguides which run along its surface in order to sweep-slave the directional louvers upon the displacement of said crank carriage.

2. An outlet nozzle comprising:
   a plurality of directional louvers which are swivel-mounted parallel and at a fixed distance to each other near their front edges around respectively one horizontal swivel axis; and
   a horizontally and vertically displaceable, flat crank carriage including crankways which run along its surface coupling with said plurality of directional louvers;
   said plurality of directional louvers being guided into a first setting of the crank carriage in a parallel directed airstream setting with the ability to swivel parallel to each other, and, during a horizontal movement of the crank carriage, said plurality of directional louvers being guided into the respective diffused-flow setting according to the respective crankways.

3. The outlet nozzle according to claim 2, wherein starting from said first setting of the crank back edges of the plurality of directional louvers are guided in a horizontal parallel swivelling motion.

4. The outlet nozzle according to claim 2, further comprising:
   a plurality of journals positioned on both sides of a front edge of the plurality of directional louvers respectively within one lateral wall of the outlet nozzle housing; and
   at least one marginal journal guide positioned on the back edge of the directional louvers within said crank carriage which is able to be horizontally and vertically guided in a lateral wall of the outlet nozzle housing.

5. The outlet nozzle according to claim 1 further comprising additional louvers which are able to swivel above or below the directional louvers at the diffused-flow setting of the directional louvers thereby increasing the diffused-flow effect from out of the region of the housing wall of the outlet nozzle housing.

6. The outlet nozzle according to claim 2 further comprising additional louvers which are able to swivel above or below the directional louvers at the diffused-flow setting of the directional louvers thereby increasing the diffused-flow effect from out of the region of the housing wall of the outlet nozzle housing.

7. The outlet nozzle according to claim 3 further comprising additional louvers which are able to swivel above or below the directional louvers at the diffused-flow setting of the directional louvers thereby increasing the diffused-flow effect from out of the region of the housing wall of the outlet nozzle housing.

8. The outlet nozzle according to claim 4 further comprising additional louvers which are able to swivel above or below the directional louvers at the diffused-flow setting of the directional louvers thereby increasing the diffused-flow effect from out of the region of the housing wall of the outlet nozzle housing.

9. The outlet nozzle according to claim 5, further comprising a rotary control knob and a crankgear associated with said knob horizontally displacing said crank carriage.

10. The outlet nozzle according to claim 5, wherein said crank carriage further comprises an additional crank guide coupled to one of said additional louvers and sweep-slaving said one of said additional louvers.

11. The outlet nozzle according to claim 9, wherein said crank carriage further comprises an additional crank guide coupled to one of said additional louvers and sweep-slaving said one of said additional louvers.

12. The outlet nozzle according to claim 11, wherein said rotary control knob is mounted to the side of the directional louvers within a housing for the outlet nozzle.

13. The outlet nozzle according to claim 9, further comprising a pinion drive for sweep-slowing at least one of said additional louvers with the rotary control knob.

14. The outlet nozzle of claim further comprising a pinion drive for sweep slaving another one of said additional louvers with said rotary control knob.

* * * * *